United States Patent [19]
Bibaut

[11] 3,819,240
[45] June 25, 1974

[54] ENDLESS TRACK
[76] Inventor: Gilbert Abel Bibaut, Le Meux, France
[22] Filed: Mar. 21, 1972
[21] Appl. No.: 236,665

[30] Foreign Application Priority Data
Mar. 22, 1971 France .............................. 71.10013
Mar. 15, 1972 France ............................... 72.9036

[52] U.S. Cl. .................................. 305/54, 115/1 R
[51] Int. Cl. ............................................ B62d 55/26
[58] Field of Search ............. 305/39, 54, 52; 115/1, 115/19, 63

[56] References Cited
UNITED STATES PATENTS
1,192,423 7/1916 Henneuse ......................... 305/54 X
1,204,799 11/1916 Luce ................................... 305/52
1,338,402 4/1920 Sibbett ................................. 305/54
1,536,604 5/1925 Bentson .............................. 305/54
1,568,090 1/1926 Saives ................................. 305/51
3,278,244 10/1966 Deffenbaugh ........................ 305/54

*Primary Examiner*—Richard J. Johnson

[57] ABSTRACT

Track for all ground vehicles, in particular for equipment with endless tracks, consisting of tubular members in the form of hollow cylinders fixed during rotation, of the endless track each cylinder being welded onto a U-section bolted on one of the links of the chain. Another embodiment of the invention discloses a cylinder being mounted so that it can oscillate on a transversal axis perpendicular to its length. The tubular member being extendible by cooperation of a sleeve affixed to the outer extremity of the tubular member and a tubular extension member.

4 Claims, 5 Drawing Figures

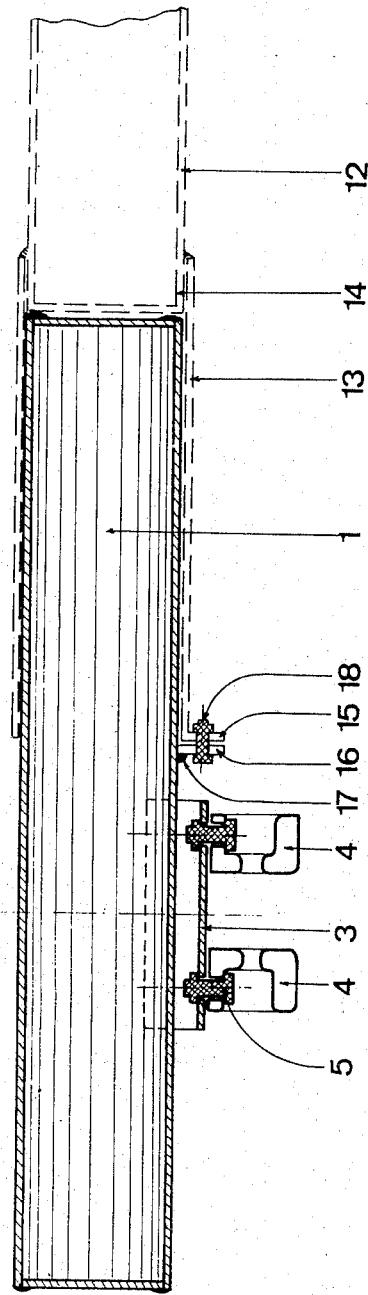

ENDLESS TRACK

The invention relates to a track specially for vehicles which have to move on muddy ground, in particular equipment fitted with endless tracks such as bulldozers, crane, tractor shovels or others.

The invention therefore relates to a track for all ground vehicles, in particular for equipment fitted with endless tracks, characterized in that it consists of a succession of tubular members periodically entering into contact with the ground. The tubular members are hollow cylinders closed at their two ends, these cylinders being fixed during rotation of the endless track around a circuit defined by conventional sprocket and return wheels.

According to a characteristic of the invention, each cylinder is fixed to the chain of the endless track by means of a U-section onto which are welded two of its generatrices, the section itself being bolted on the links of the chain.

According to another characteristic, each tubular member is mounted so that it can oscillate on an axle which is transversal to its generatrices.

The invention also covers all ground vehicles such as equipment fitted with endless tracks and equipped with a track according to the invention.

Figure 1:
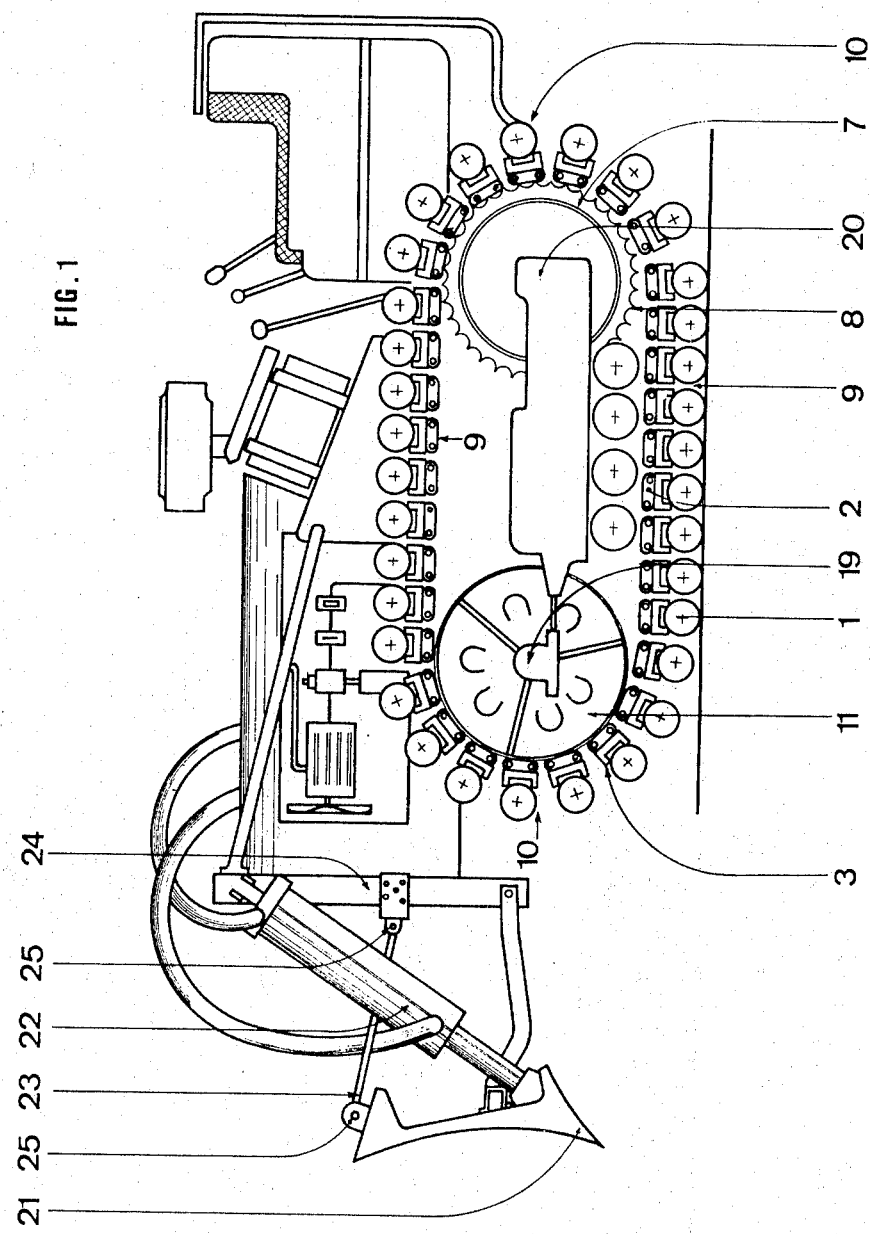
Figure 4:
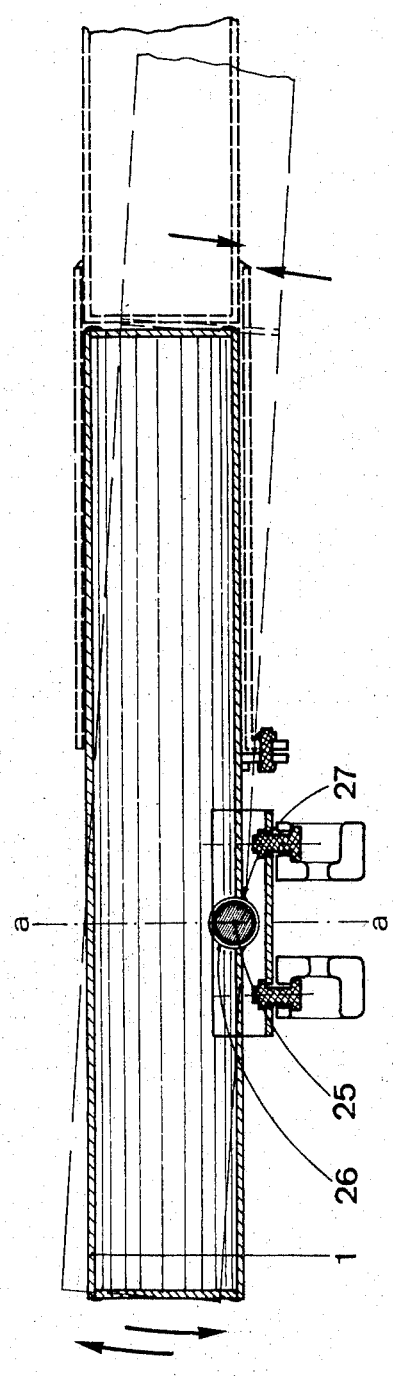
Figure 5:
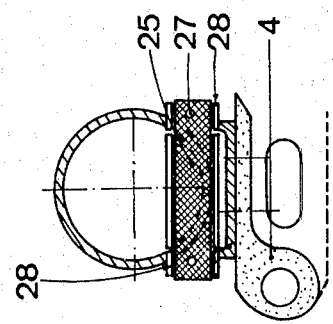

A track according to the invention is illustrated by way of a non-limitative example, on the accompanying figures in which:

FIG. 1 is a schematic plan view of the track on a tractor provided with a levelling blade, FIG. 2 is a cross-sectional cut of one of the cylinders of the track, FIG. 3 is an axial view of one of the cylinders equipped with a tubular extension piece, FIG. 4 is a plan view illustrating the oscillation of the tubular members, FIG. 5 is a cross-sectional view of FIG. 4, along the axis AA.

The track consists of a succession of tubular members 1 in the form of hollow cylinders completely sealed at their ends; these cylinders have, in the example under consideration, a length of 0.85 m and a diameter of 0.14 m, each of the cylinders being fixed to the usual chain 2 of the equipment fitted with endless tracks by means of sections 3 having a transversal section in the form of a U.

Each section 3 (FIG. 2) is connected to the link 4 of the chain by means of pins and nuts 5, each cylinder being welded at 6 onto the upper edges of these sections.

The two welding areas extend over the whole length of the sections following two of the generatrices of the cylinders.

The cylinders 1 extend over the whole perimeter of the chain so as to enter successively into contact with the ground as the chain moves driven by the sprocket wheel 7 whose teeth 8 engage with the links 4 of the chain. These cylinders, as represented in FIG. 1, approach one another in the straight parts 9 of the chain and divert progressively in the two curved areas 10 on account of their winding themselves onto the sprocket wheel 7 and the return wheel 11, which enables the mud accumulated between the cylinders 1 to be evacuated simply by gravity.

These cylinders overlap each side of the chain 2 and extend over a relatively considerable width thereby appreciably increasing the surface contact area of the track links with the ground. This increase in the surface area, compared with the use of the traditional track-links used with equipment fitted with endless tracks, enable the risk of equipment sinking into muddy ground, particularly when the equipment is used in draining or clearing operations related to marshes or pools, to be avoided.

In addition, these cylinders increase the general diameter of the track enabling the equipment to surmount without difficulty such obstacles as slopes or others.

The carrying surface of the equipment can be further augmented by means of tubular extension pieces 12 (FIG. 3) which axially prolong the cylinders 1, these tubular extension pieces being maintained in position by the sleeves 13 which surround a part of the cylinders and overlap a part 14 of these extension pieces.

The sleeves 13 comprise, at their extremity fixed toward the interior of the endless track, an end piece 15 bent to 90°, this angle piece can be opposite another identical angle piece 16 welded at 17 on the cylinders 1, these angle pieces 15 and 16 being fitted by means of bolts and nuts 18.

In order to avoid deforming the tubular extension pieces 12, it is possible to use elastic elements, notably large diameter tires, mounted on the axis 19 and 20 of the return wheel and the sprocket wheel. Thus the cylinders are maintained in position by the track of the tire, which plays the role of a shock absorber and thus avoids the axial deformation of said cylinders.

As represented on the FIGS. 4 and 5, each tubular member 1 may be mounted so that it can oscillate on an axle 25, on which turns a axle sleeve 26. Thus each tubular member 1 is provided with a axle sleeve 26, welded at 27, this axle sleeve, a part of the tubular member surrounds axle 25, and can turn with respect to the axle 25 which is fixed to remain perpendicular to the axis of the tubular member during rotation of the endless chain. Thus, as illustrated in FIG. 5, the axle 25 is maintained at its two extremities in the two rings 28, welded on the U-section 3, which is screwed onto the link 4 of the chain. The axle 25 is immobilised during rotation by the pins 27, which pass through it and penetrate into the rings 28. The tubular member 1, integrally connected to axle sleeve 26 at 27, can rotate around fixed axle 25 in a direction perpendicular to the length of the tubular member 1. Axle sleeve 26 surrounds fixed axle 25, but is of lesser length and of greater diameter than axle 25.

The lesser length of axle sleeve 26 allows axle 25 to be fixed to the chain link by rings 28 welded on U-section 3. The greater diameter of axle sleeve 26 allows rotation of the axle sleeve and the integrally connected tubular member 1, around the axle 25.

On account of this design, each tubular organ of the track is mounted so that it can rock and it can therefore take up various angular positions, of the type showed by the hatched lines on FIG. 1 so as to pass over any obstacle, whether it is a stone, a tree root, or other obstacle in the path of the moving track.

This oscillating mounting of the tubular members has the advantage not only of enabling the track to ignore obstacles, but also to preserve the chain from any unecessary strains which might reduce its life. Thus, as the tubular members are mounted so that they can oscillate, the chain is always in the same plane and is therefore not under unecessay strain.

The track, according to the invention, not only enables the equipment fitted with tracks not to sink deeply into the ground, but also avoids the suction cap effect observed with traditional equipment fitted with tracks and equipped with track-links. Here, the cylinders do not enter into contact with the ground except along a part of their periphery, which avoids all suction effects. This track can be mounted on the whole of the equipment that it used on muddy ground, in particular on tractors, cranes and draining, clearing and other equipment.

In the example given, the track is shown in a tractor of which the forward part is provided with a levelling blade 21 which can be oriented in three directions, by means of two screw jacks 22, each located at the end of the blade and by a torsion bar 23 of which the ends are connected to the levelling blade 21 and to the frame 24 by means of swivel joints 25.

It is obvious that the invention is not limited to the application herein above described and illustrated and on the basis of which it is possible to envisage other forms and modes of application within the scope of the invention.

What I claim is:

1. An endless track including interconnected links for ground vehicles to facilitate the operation of said vehicles in wet areas or difficult terrain, consisting of;
    a. a plurality of hollow tubular members comprising the track surface,
    b. said tubular member being sealed at its end extremities,
    c. said tubular member having an axis perpendicular to the length of the tread and being pivotally connected to the link of the endless track, and,
    d. said pivotal connection of the tubular member having an axis in the surface of the tread and along the length of the tread, allowing transverse longitudinal rotation of the tubular member, said rotation being perpendicular to the length of said tubular member.

2. The endless track of claim 1, wherein a detachable sleeve is provided on the outer extremity of the hollow tubular member to allow extension of said tubular member by cooperation of an extension member interfitted into said sleeve.

3. In an endless track for ground vehicles comprising:
    a. laterally spaced pairs of pivotally interconnected links,
    b. each of said pairs of links being integrally connected by a U-shaped member,
    c. a hollow cylindrical member closed at it ends, intergrally secured within each U-shaped member and extending laterally beyond the sides of said links,
    d. the axes of each of said cylindrical members being parallel to the pivot axes of the pivotally interconnected links, and,
    e. said cylindrical members providing a ground engaging surface during operation of the track.

4. The endless track of claim 3, wherein a detachable sleeve with a cylindrical extension member interfitted into said sleeve is provided on the outer extremity of the cylindrical member to allow extension of said cylindrical member.

* * * * *